US012691312B2

(12) United States Patent
Honjo et al.

(10) Patent No.: US 12,691,312 B2
(45) Date of Patent: Jul. 28, 2026

(54) FIRE EXTINGUISHING BODY

(71) Applicant: TOPPAN HOLDINGS INC., Tokyo (JP)

(72) Inventors: Yusaku Honjo, Tokyo (JP); Masato Kurokawa, Tokyo (JP); Ryo Shoda, Tokyo (JP); Junya Tanabe, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 188 days.

(21) Appl. No.: 18/398,976

(22) Filed: Dec. 28, 2023

(65) Prior Publication Data

US 2024/0131374 A1 Apr. 25, 2024
US 2024/0226622 A9 Jul. 11, 2024

Related U.S. Application Data

(63) Continuation of application No. PCT/JP2022/025844, filed on Jun. 28, 2022.

(30) Foreign Application Priority Data

Jul. 2, 2021 (JP) ................................ 2021-110930

(51) Int. Cl.
*A62C 8/00* (2006.01)

(52) U.S. Cl.
CPC ..................................... *A62C 8/00* (2013.01)

(58) Field of Classification Search
CPC .. A62C 8/00; A62C 3/16; A62C 19/00; B32B 3/04; B32B 27/32; A62D 1/00
See application file for complete search history.

(56) References Cited

U.S. PATENT DOCUMENTS

| | | | | |
|---|---|---|---|---|
| 5,945,025 | A * | 8/1999 | Cunningham | ....... A62D 1/0035 252/2 |
| 2013/0029064 | A1 | 1/2013 | Kariya | |
| 2019/0046822 | A1 | 2/2019 | Iwasaki et al. | |
| 2020/0044203 | A1 | 2/2020 | Hwang et al. | |
| 2024/0421387 | A1 | 12/2024 | Hwang et al. | |

FOREIGN PATENT DOCUMENTS

| | | | |
|---|---|---|---|
| CN | 103505835 | A | 1/2014 |
| CN | 108697913 | A | 10/2018 |
| JP | H09-276440 | A | 10/1997 |
| JP | 10-201871 | A | 8/1998 |
| JP | H10-201871 | A | 8/1998 |
| JP | 2003-117016 | A | 4/2003 |

(Continued)

OTHER PUBLICATIONS

English translation JP6492499 Date:Apr. 3, 2019.*
European Extended Search Report issued in corresponding European Patent Application No. 22833186.4 dated Aug. 27, 2024 (8 pages).

*Primary Examiner* — Qingzhang Zhou
(74) *Attorney, Agent, or Firm* — Studebaker Brackett PLLC

(57) ABSTRACT

A fire extinguishing body comprising a packaging bag formed from one or more substrates each comprising a resin layer, and a deliquescent fire extinguishing agent sealed in the packaging bag, the packaging bag having a sealing part at its peripheral edge, and the adhesion strength between the substrates in the sealing part being 5 N/15 mm or more.

18 Claims, 7 Drawing Sheets

(56) References Cited

FOREIGN PATENT DOCUMENTS

| | | | | | |
|---|---|---|---|---|---|
| JP | 2015-006302 | A | | 1/2015 | |
| JP | 2015-037445 | A | | 2/2015 | |
| JP | 2017-080023 | A | | 5/2017 | |
| JP | 6492499 | B2 | * | 4/2019 | |
| KR | 10-2019-0031428 | A | | 3/2019 | |
| KR | 10-2255537 | B1 | | 5/2021 | |
| WO | WO-2014/069022 | A1 | | 5/2014 | |
| WO | WO-2018/012503 | A1 | | 1/2018 | |
| WO | WO-2021045609 | A1 | * | 3/2021 | ............. A62C 99/00 |

* cited by examiner

FIRE EXTINGUISHING BODY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/025844, filed on Jun. 28, 2022, which is based upon and claims the benefit of priority to Japanese Patent Application No. 2021-110930, filed on Jul. 2, 2021, the disclosures of which are incorporated herein by reference in their entirety.

TECHNICAL FIELD

The present invention relates to a fire extinguishing body.

BACKGROUND ART

In recent years, with the advancement of technology, our lives have become more and more comfortable, but at the same time, a large amount of energy is required to produce such comfort. High safety is required for the handling of energy in each situation of storing, transferring, and using a large amount of energy in a high density.

Taking automobiles as an example, there is risk of ignition and fire, for example, when fossil fuels are mined, when gasoline is refined from fossil fuels, when gasoline is transported, or when gasoline is burned in engines. Further, taking electronics as an example, there is risk of ignition and fire, for example, when electrical energy is transferred through power lines, when electrical energy is adjusted at substations and transformers, when electrical energy is used in electrical equipment in homes and factories, or when electrical energy is temporarily stored in rechargeable batteries.

In response to the problems of ignition and fire, PTL 1 has proposed the use of a fire extinguishing liquid and an extinguisher. PTL 2 has proposed an automatic fire extinguishing device to be dropped from a helicopter. PTL 3 has proposed an aerosol fire extinguishing device.

CITATION LIST

Patent Literature

PTL 1: JP H9-276440 A; PTL 2: JP 2015-6302 A; PTL 3: JP 2017-080023 A.

SUMMARY OF THE INVENTION

Technical Problem

All of the prior arts propose ways to deal with fire after a certain amount of time has elapsed. On the other hand, from the viewpoint of minimizing damage caused by fire, it is desirable that some kind of fire extinguishing work (initial fire extinguishing) be performed soon after the fire breaks out.

Therefore, for example, it is possible to locate in advance components of the fire extinguishing agents disclosed in the prior arts near an object that may catch fire. In this way, it is expected that the components of the fire extinguishing agents will extinguish the fire before humans detect the fire from the object. However, if a deliquescent fire extinguishing agent component is used, the fire extinguishing agent may deteriorate with time, even if the fire extinguishing agent is sealed in a packaging bag.

The present invention was made in view of the above circumstances, and an object thereof is to provide a fire extinguishing body that ensures excellent stability of the properties of a deliquescent fire extinguishing agent and is capable of preventing the outbreak and spread of fire.

Solution to Problem

One aspect of the present invention is to provide a fire extinguishing body comprising a packaging bag formed from one or more substrates each comprising a resin layer, and a deliquescent fire extinguishing agent sealed in the packaging bag, the packaging bag having a sealing part at its peripheral edge, and the adhesion strength between the substrates in the sealing part being 5 N/15 mm or more. With such a fire extinguishing body, the packing bag with the peripheral edge sufficiently sealed prevents contact between the fire extinguishing agent and the outside air, thereby preventing the deterioration of the deliquescent fire extinguishing agent. That is, the above fire extinguishing body ensures excellent stability properties of the fire extinguishing agent. Further, by placing the fire extinguishing body near the object in advance, it is possible to extinguish the fire at an early stage and to prevent the fire from spreading to the surrounding area.

In an embodiment, the resin layer may comprise a polyolefin resin.

In an embodiment, the substrate may have a thickness of 4.5 to 1000 μm.

In an embodiment, the substrate may further comprise a gas barrier layer.

In an embodiment, the gas barrier layer may comprise a metal layer or a metal oxide layer.

In an embodiment, the resin layers may be thermally fused together in the sealing part.

In an embodiment, the sealing part may have a width of 5 mm or more.

Advantageous Effects of the Invention

According to the present invention, it is possible to provide a fire extinguishing body that ensures excellent stability of properties of a deliquescent fire extinguishing agent and is capable of preventing the outbreak and spread of fire. The advantages of the present invention are briefly summarized below.

Damage caused by the spread of flames can be kept to a minimum. That is, initial fire extinguishing is possible.

After a person confirms the existence of a fire, the person does not need to carry a fire extinguishing agent near the fire extinguishing target to extinguish the fire.

Compared to automatic fire extinguishing devices and other equipment, the fire extinguishing body can be easily installed; thus, there are fewer restrictions on installation locations, and it can be applied to any necessary location.

Even when the fire extinguishing agent is deliquescent, the fire extinguishing agent can be stably sealed; thus, the frequency of replacement of the fire extinguishing body can be reduced.

DETAILED DESCRIPTION

Embodiments of the present invention will be described below with reference to the drawings. In the following description of the drawings to be referred, components identical with or similar to each other are given the same or similar reference signs. It should be noted that the drawings are only schematically illustrated, and thus the relationship between thickness and two-dimensional size of the components, and any thickness ratios, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. In addition, the drawings are exaggerated as appropriate to facilitate understanding.

Hereinafter, embodiments of the present invention will be described with reference to the drawings.

<Fire Extinguishing Body>

Figure 1:
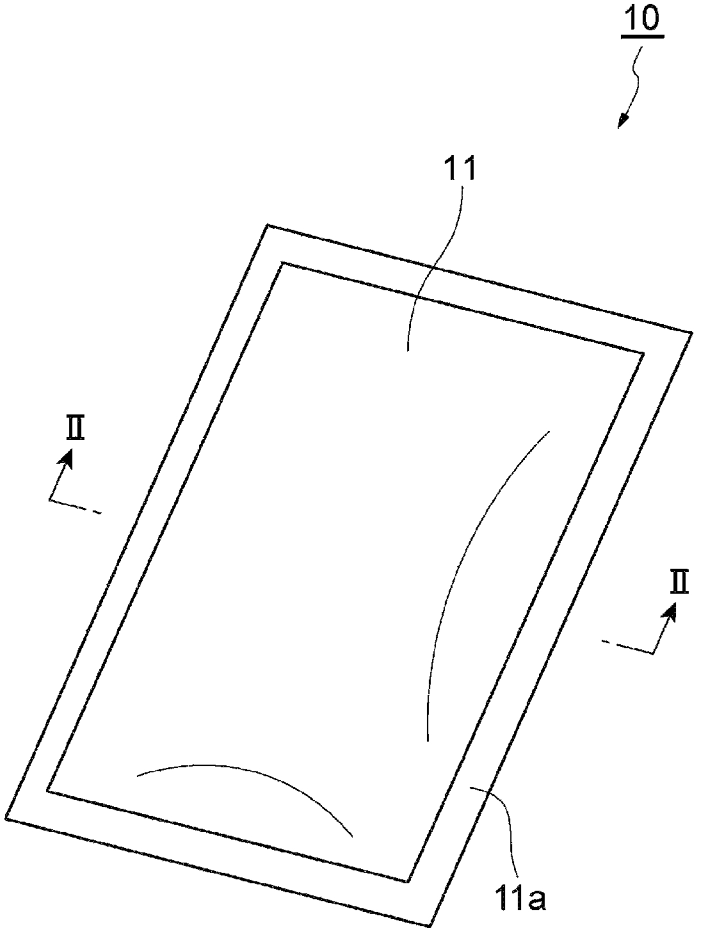
FIG. 1 is a schematic external view of a fire extinguishing body according to an embodiment.
Figure 2:
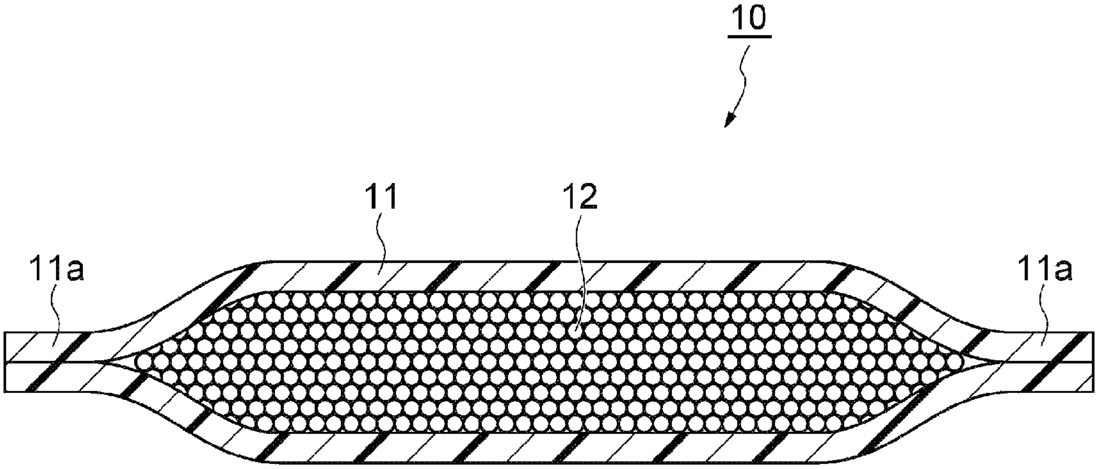
FIG. 2 is a schematic cross-sectional view of the fire extinguishing body according to the embodiment, and is a cross-sectional view taken along line II-II of FIG. 1.

FIG. 1 is a schematic external view of a fire extinguishing body according to an embodiment. FIG. 2 is a schematic cross-sectional view of the fire extinguishing body according to the embodiment, and is a cross-sectional view taken along line II-II of FIG. 1. The fire extinguishing body 10 comprises a packaging bag 11 formed from substrates each comprising a resin layer, and a fire extinguishing agent 12 sealed in the packaging bag. The packaging bag 11 has a sealing part 11*a* at its peripheral edge, and the substrates are joined together in the sealing part 11*a*. In this embodiment, it can be said that the resin layers are thermally fused together in the sealing part.

Figure 3:
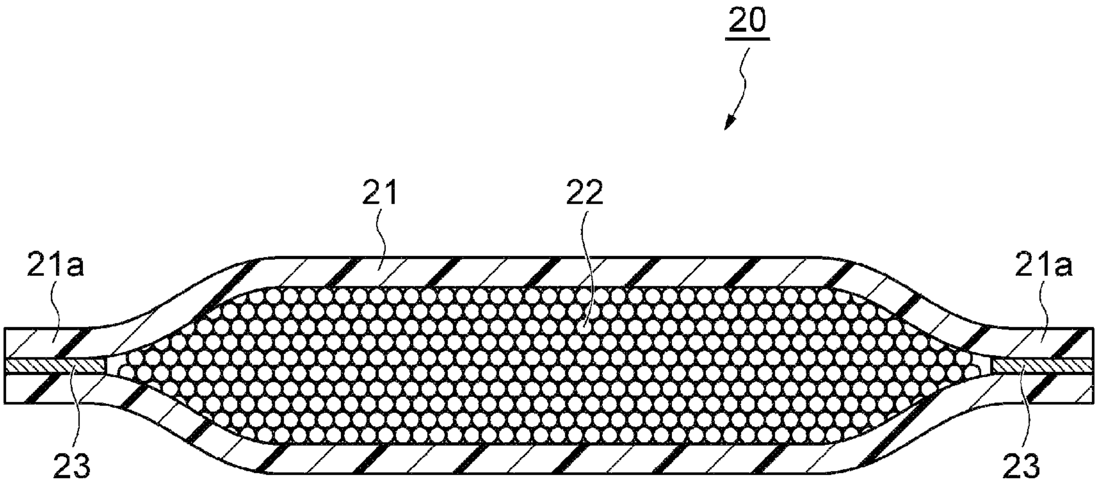
FIG. 3 is a schematic cross-sectional view of a fire extinguishing body according to another embodiment.

FIG. 3 is a schematic cross-sectional view of a fire extinguishing body according to another embodiment. The fire extinguishing body 20 comprises a packaging bag 21 formed from substrates each comprising a resin layer, and a fire extinguishing agent 22 sealed in the packaging bag. The packaging bag 21 has a sealing part 21*a* at its peripheral edge, and the substrates are joined together with an adhesive 23 in the sealing part 21*a*. In this embodiment, it can be said that the resin layers are bonded together with an adhesive in the sealing part.

Figure 4:
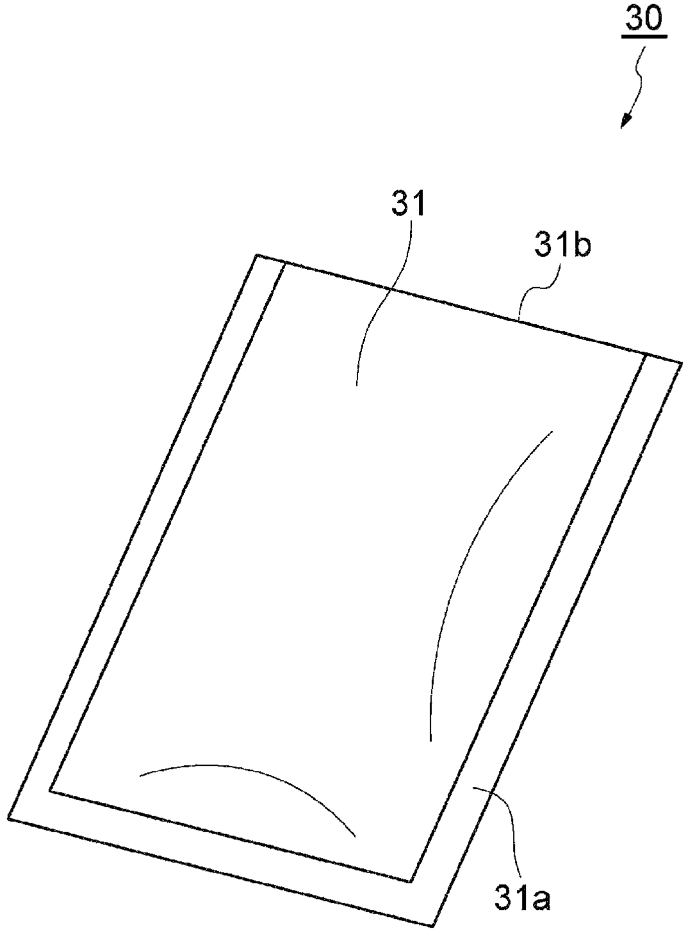
FIG. 4 is a schematic external view of a fire extinguishing body according to another embodiment.

FIG. 4 is a schematic external view of a fire extinguishing body according to another embodiment. The fire extinguishing body 30 comprises a packaging bag 31 formed from a substrate comprising a resin layer, and a fire extinguishing agent (not shown) sealed in the packaging bag. The packaging bag 31 has a sealing part 31*a* and a folded part 31*b* at its peripheral edge, and the substrates are joined together in the sealing part 31*a*. The folded part 31*b* is formed by folding a single substrate that is used in place of a pair of substrates. The sealing part 31*a* may have a form according to the sealing part 11*a* or a form according to the sealing part 21*a*.

The adhesion strength between the substrates in the sealing part is 5 N/15 mm or more. As a result, even if the fire extinguishing agent is deliquescent, the fire extinguishing agent can be stably sealed. From this point of view, the adhesion strength may be 7 N/15 mm or more, or may be 10 N/15 mm or more. The upper limit of the adhesion strength is not particularly limited, but can be about 35 N/15 mm because material failure may occur during strength measurement. The adhesion strength can be changed, for example, by adjusting the resin layer, adhesive, and heat-sealing conditions (heat-sealing temperature, pressure, and time).

The adhesion strength between the substrates can be measured as described below. Specifically, a sample is prepared by bonding together resin layers of substrates by thermal-fusion-bonding or using an adhesive. The thermally fused part or adhesive part of the sample is cut into 15-mm-wide pieces and peeled off in a T-shape at a peeling speed of 300 mm/min in a tensile tester placed in an environment at room temperature of 23° C. according to JIS K 6854-3. The average strength from the start of peeling to the point where the thermally fused part or adhesive part is separated is defined as the adhesion strength between the substrates.

When the fire extinguishing body is viewed vertically from above, the width of the sealing part (fusion width or adhesive width) is not particularly limited, but can be, for example, 5 mm or more, and may be 5 to 40 mm, in terms of the stability of properties of the fire extinguishing agent.

The thickness of the central portion of the fire extinguishing body is not necessarily limited because it varies depending on the layer structure and the amount of fire extinguishing agent sealed therein; however, the thickness can be, for example, 2 to 20 mm, in terms of capable of reducing the thickness so that installation space is not an issue while maintaining fire extinguishing performance. Further, the area of the main surface of the fire extinguishing body (the surface when the fire extinguishing body is viewed perpendicularly from above) can be, for example, 9 to 620 cm2 in terms of fire extinguishing performance and ease of handling.

The fire extinguishing body is installed in advance on or near an object that may catch fire. If the object catches fire, initial fire extinguishing will be performed by the fire extinguishing body.

(Substrate)

The substrate comprises a resin layer. Examples of the material of the resin layer include polyolefins (PE, PP, COP, etc.), polyesters (PET etc.), fluororesins (PTFE, ETFE, EFEP, PFA, FEP, PCTFE, etc.), vinyl resins (PVC, PVA, etc.), acrylic resins, epoxy resins, polyamides, polyimides, and the like. The substrate may be composed of one resin layer made of such a material or may be composed of a plurality of resin layers. A plurality of resin layers may be made of different materials. When the substrate is composed of a plurality of layers, the layers may be attached together using an adhesive (adhesive layer). Examples of adhesives include acrylic adhesives, epoxy adhesives, silicone adhesives, polyolefin adhesives, urethane adhesives, polyvinyl ether adhesives, or synthetic adhesives thereof (e.g., epoxy-urethane synthetic adhesives), and the like.

The resin layer may have thermal-fusion-bonding properties (thermally-melting properties). The resin layer having thermal-fusion-bonding properties can be regarded as a thermally fused layer. The thermally fused layer can be provided on the innermost layer side (side facing toward the fire extinguishing agent) of the substrate. When the substrate comprises a thermally fused layer, the sealing part of the packaging bag peripheral edge can be regarded as a thermally fused part (heat-seal part). A thermally-fusible polyolefin resin can be used as the resin That is, the resin layer may contain a polyolefin resin. Examples of polyolefin resins include polyolefin resins, such as low-density polyethylene resin (LDPE), linear low-density polyethylene resin (LLDPE), medium-density polyethylene resin (MDPE), and non-oriented polypropylene resin (CPP); polyethylene resins, such as ethylene-vinyl acetate copolymers and ethylene-α-olefin copolymers; polypropylene resins, such as propylene-ethylene random copolymers, propylene-ethylene block copolymers, and propylene-α-olefin copolymers; and the like. Among these, in terms of excellent heat sealability, and low moisture permeability, which makes it easy to suppress the deterioration of the fire extinguishing agent, the polyolefin resin may contain low-density polyethylene resin (LDPE), linear low-density polyethylene resin (LLDPE), or non-oriented polypropylene resin (CPP). These resins have transparency and facilitate the visual inspection of fire extinguishing agents. Therefore, this makes it easier to check the time for replacement of the fire extinguishing body.

The substrate may comprise a gas barrier layer. The gas barrier layer may be provided on the outermost layer side of the substrate or may be provided as an intermediate layer of the substrate. When the substrate comprises a gas barrier layer, it becomes easier to maintain gas barrier performance to the extent that the properties of the fire extinguishing agent do not change significantly, regardless of the installation location or use environment of the fire extinguishing body. The moisture permeability (according to JIS K 7129, under 40° C./90% RH conditions) of the gas barrier layer is not particularly limited because it can be designed depending on the type of fire extinguishing agent; however, the moisture permeability can be 10 g/m2/day or less, and may be 1 g/m2/day or less. In terms of adjusting moisture permeability, examples of the gas barrier layer include metal layers, metal oxide layers, and the like, and specific examples include metal oxide deposition layers such as an alumina deposition layer and a silica deposition layer, and metal foil such as aluminum foil. In addition to the resin layer provided as the innermost layer, the substrate may further comprise a resin layer for supporting the gas barrier layer. When the gas barrier layer comprises a metal oxide deposition layer, the metal oxide deposition layer may face the fire extinguishing agent side.

The thickness of the substrate can be suitably selected depending on the use environment of the fire extinguishing body, the allowable space, and the like. For example, a thick substrate makes it easier to suppress water vapor permeation, provide strength and rigidity, provide a highly planar shape, and facilitate handling. Further, a thin substrate makes it possible to install the fire extinguishing body in a narrow space. The thickness of the substrate can be, for example, 4.5 to 1000 μm, and may be 12 to 100 μm or 12 to 50 μm. The thickness of the resin layer and the gas barrier layer may be suitably adjusted depending on the thickness of the substrate. The thickness of the resin layer (when the substrate comprises a plurality of resin layers, the total thickness of the layers) can be, for example, 4.5 to 150 μm, and may be 10 to 100 μm. The thickness of the gas barrier layer can be, for example, 5 to 100 nm in the case of a metal oxide deposition layer, and 0.8 to 30 μm in the case of a metal foil.

(Fire Extinguishing Agent)

The fire extinguishing agent is not particularly limited, and fire extinguishing agents that have the so-called four elements of fire extinguishing (starving action, cooling action, smothering action, and negative catalytic action) can be suitably used depending on the form of the object. The packaging bag of the present embodiment can be suitably used particularly for deliquescent fire extinguishing agents. Examples of deliquescent fire extinguishing agents include general extinguishing agents (e.g., powder fire extinguishing agents using a potassium salt as a main component, and general powder fire extinguishing agents such as sodium hydrogen carbonate and phosphate). Examples of versatile fire extinguishing agents include ABC fire extinguishing agents, and examples of fire extinguishing agents for oil and electrical fires include BC fire extinguishing agents. When the object is a lithium ion battery, BC fire extinguishing agents and fire extinguishing agents for other lithium ion batteries are used.

The fire extinguishing agent may contain at least one of an organic salt and an inorganic salt that generally have fire extinguishing performance and deliquescence.

Examples of organic salts that function as a fire extinguishing agent include potassium salts, sodium salts, ammonium salts, and the like. A potassium salt can be preferably used as the organic salt. Examples of organic potassium salts include carboxylic acid potassium salts, such as potassium acetate, potassium citrate (tripotassium citrate, dipotassium citrate, and monopotassium citrate), potassium tartrate, potassium lactate, potassium oxalate, and potassium maleate. Among these, potassium citrate can be used in terms of usefulness for the negative catalytic effect of combustion.

Examples of inorganic salts that function as a fire extinguishing agents include potassium salts, sodium salts, and the like. A potassium salt can be preferably used as the inorganic salt. Examples of inorganic potassium salts include potassium tetraborate, potassium carbonate, potassium hydrogen carbonate, potassium dihydrogen phosphate, dipotassium hydrogen phosphate, and the like. Among these, potassium hydrogen carbonate can be used in terms of usefulness for the negative catalytic effect of combustion.

Organic salts and inorganic salts each may be used singly or in combination of two or more.

The fire extinguishing agent may contain compounds other than the salts described above. Examples of other components include oxidizing agents for improving salt reactivity, and specific examples include potassium chlorate, sodium chlorate, strontium chlorate, ammonium chlorate, magnesium chlorate, and the like. Other examples of other components include colorants, antioxidants, flame retardants, inorganic fillers, fluidity-imparting agents, moisture retardants, dispersants, UV absorbers, metal catalysts, and the like.

The amount of the fire extinguishing agent can be suitably selected depending on the form of the object, the power of the fire at the time of ignition, the extinguishing time, the allowable space, and the like. The larger the amount of the fire extinguishing agent, the better the fire extinguishing ability and the shorter the extinguishing time; however, it may also be bulkier, which limits the space where the fire extinguishing body can be placed. The amount of the fire extinguishing agent may be, for example, 0.4 to 3.9 g/cm2, 1.0 to 2.5 g/cm2, 0.01 to 1.0 g/cm2, or 0.02 to 0.2 g/cm2.

The fire extinguishing agent may be mixed with a binder. That is, the fire extinguishing agent may be a composition containing a fire extinguishing agent (fire extinguishing agent component) and a binder. The content of the fire extinguishing agent in the composition (fire extinguishing agent composition) can be 70 to 97 mass % based on the total amount of the fire extinguishing agent composition.

A thermoplastic resin and a thermosetting resin can be used as binder resins. Examples of thermoplastic resins include polyolefin resins, such as polyvinyl alcohol resin, polyvinyl acetal resin, polypropylene resin, polyethylene resin, poly(1-)butene resin, and polypentene resin; polystyrene resin, acrylonitrile-butadiene-styrene resin, methyl methacrylate-butadiene-styrene resin, ethylene-vinyl acetate resin, ethylene-propylene resin, polycarbonate resin, polyphenylene ether resin, acrylic resin, polyamide resin, polyvinyl chloride resin, and the like. Examples of thermosetting resins include natural rubber (NR), isoprene rubber (IR), butadiene rubber (BR), 1,2-polybutadiene rubber (1,2-BR), styrene-butadiene rubber (SBR), chloroprene rubber (CR), nitrile rubber (NBR), butyl rubber (IIR), ethylene-propylene rubber (EPR, EPDM), chlorosulfonated polyethylene (CSM), acrylic rubber (ACM, ANM), epichlorohydrin rubber (CO, ECO), polyvulcanized rubber (T), silicone rubber (Q), fluororubber (FKM, FZ), urethane rubber (U), and other rubbers, polyurethane resin, polyisocyanate resin, polyisocyanurate resin, phenol resin, epoxy resin, and the like. The binder resin may contain a hardener component.

The fire extinguishing agent may be formed as a fire extinguishing agent layer on a fire extinguishing agent support layer. The use of the fire extinguishing agent support layer facilitates the handling of the fire extinguishing agent. Examples of the fire extinguishing agent support layer include the layers mentioned above as examples of the resin layer of the substrate, and specific examples include polyester resin layers (e.g., PET layer).

The fire extinguishing agent layer can be formed on an object by applying a coating liquid of a fire extinguishing agent composition containing a liquid medium onto the fire extinguishing agent support layer of the object, followed by drying.

Coating can be performed by a wet coating method. Examples of the wet coating method include a gravure coating method, a comma coating method, a spray coating method, a dip coating method, a curtain coating method, a spin coating method, a sponge roll method, a die coating method, coating with a brush, and the like.

The viscosity of the coating liquid is preferably, for example, 1 to 2000 mPa·s when using a gravure coating method, 500 to 100000 mPa·s when using a comma coating method, and 0.1 to 4000 mPa·s when using a spray coating method. The amount of the liquid medium may be suitably adjusted so that the coating liquid viscosity falls within the desired range. The viscosity can be measured with a coaxial double-cylinder rotational viscometer.

The amount of the liquid medium may be suitably adjusted depending on the usage of the coating liquid, but can be 40 to 60 mass % based on the total amount of the fire extinguishing agent composition.

(Adhesive)

Examples of adhesives include acrylic adhesives, epoxy adhesives, silicone adhesives, polyolefin adhesives, urethane adhesives, polyvinyl ether adhesives, or synthetic adhesives thereof, and the like. Among these, urethane adhesives and epoxy-urethane synthetic adhesives can be preferably used as adhesives, in terms of achieving both adhesion to the substrate under 85° C.-85% RH high-temperature and high-humidity conditions, and low cost.

By using an adhesive, the peripheral edges of the substrates can be joined even if the resin layer does not have thermal-fusion-bonding properties. When an adhesive is used to join the peripheral edges of the substrates, the sealing part of the packaging bag peripheral edge can be regarded as an adhesive part.

In FIG. 3, an adhesive is used only for the sealing part; however, if the adhesive does not affect the stability of properties of the fire extinguishing agent, it may also be used on the entire inner surface of the substrate.

Figure 5:
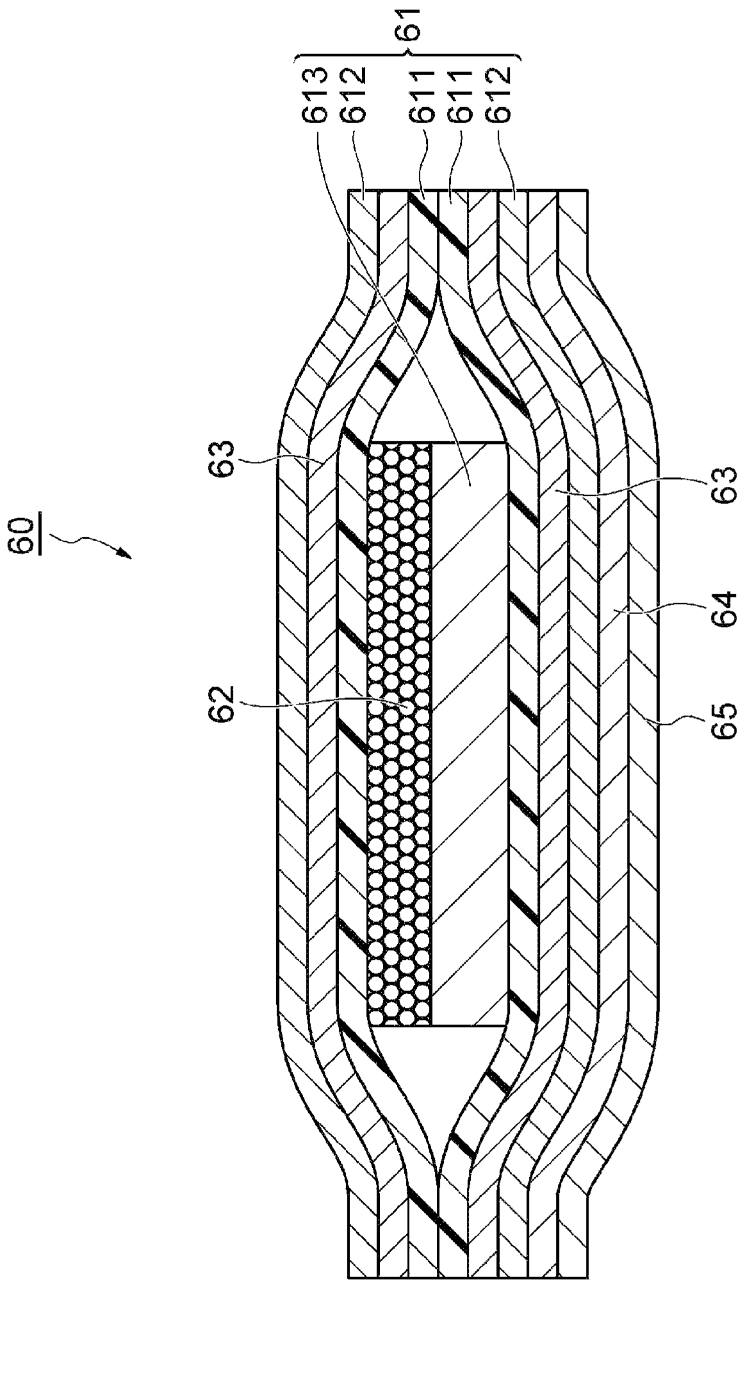
FIG. 5 is a schematic cross-sectional view of a fire extinguishing body according to another embodiment.

FIG. 5 is a schematic cross-sectional view of a fire extinguishing body according to another embodiment. The fire extinguishing body 60 comprises a packaging bag 61 formed from a substrate, a fire extinguishing agent 62 sealed in the packaging bag, and a sticky layer 64 (or an adhesive layer) and a release film 65 on one surface of the packaging bag. The substrate comprises a resin layer 611 as the inner layer, and a gas barrier layer 612 as the outer layer. The resin layer 611 and the gas barrier layer 612 are laminated via an adhesive layer 63. The fire extinguishing agent 62 is formed as a fire extinguishing agent layer on a fire extinguishing agent support layer 613. In the present embodiment, since the sticky layer 64 is provided on one surface of the packaging bag, the fire extinguishing body can be more easily installed where there is a risk of ignition. Moreover, the release film 65 is provided so as to cover the sticky layer 64. The release film 65 is to be peeled when the fire extinguishing body is attached to the desired location, and may be made of resin or paper.

The fire extinguishing body may further comprise a design layer. The design layer can be formed by printing or typing. Specific examples of designs include wood grain, solid white and gray patterns and tile-like patterns with an awareness of living spaces, as well as pictures, patterns, designs, character patterns, and the like. Providing a design layer results in effects that designability can be enhanced, the fire extinguishing body can be made fit with its surroundings, and the strength of the fire extinguishing body can be increased. For example, in the embodiment of FIG. 5, a design layer can be provided on the opposite side of the sticky layer side of the packaging bag (the side to which the fire extinguishing body is bonded). When the layers contained in the substrate are transparent, a design layer may be provided in the substrate. For example, in the embodiment of FIG. 5, a design layer may be provided inside the gas barrier layer. The design layer may have a single-layer structure, or may have a multilayer structure.

(Objects to be Extinguished)

Objects to be extinguished are not particularly limited as long as they may catch fire. Examples of objects that may catch fire include electrical wires, switchboards, distribution boards, control panels, rechargeable batteries (lithium-ion batteries etc.), wallpaper for building materials, building materials such as ceiling materials, lithium-ion battery collection boxes (recycling boxes), trash cans, automotive-related parts, electrical outlets, electrical outlet covers, and other parts.

<Method for Producing Fire Extinguishing Body>

The fire extinguishing body can be produced, for example, by the production method described below; however, the method is not limited thereto.

Figure 6:
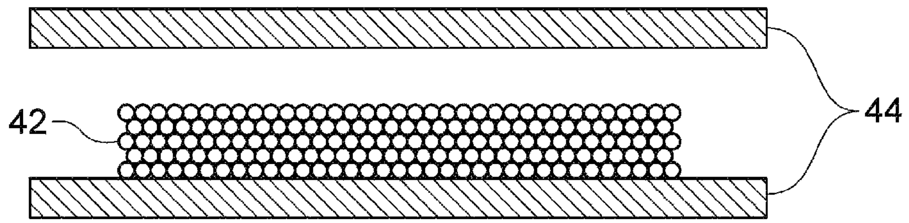
FIG. 6 is a schematic view showing a method for producing a fire extinguishing body according to an embodiment.

FIG. 6 is a schematic view showing a method for producing a fire extinguishing body according to an embodiment. As shown in this figure, a fire extinguishing agent 42 is provided between a pair of substrates 44, the peripheral edges of the substrates 44 are joined and sealed by heat sealing or using an adhesive, whereby a fire extinguishing body can be obtained. Heat sealing can be performed using a heat seal bar, for example, at 80 to 140° C. and 0.15 to 0.4 MPa for 0.1 to 50 seconds.

Figure 7:
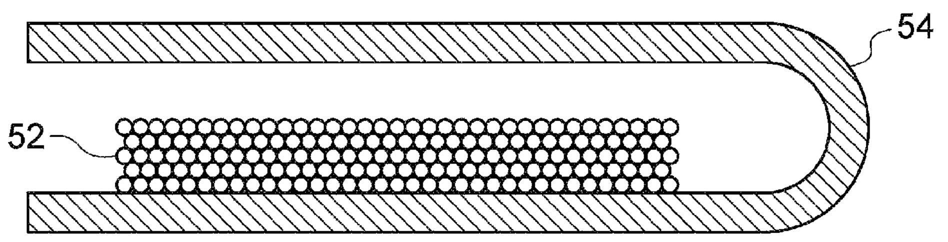
FIG. 7 is a schematic view showing a method for producing a fire extinguishing body according to another embodiment.

FIG. 7 is a schematic view showing a method for producing a fire extinguishing body according to another embodiment. As shown in this figure, a single substrate 54 is folded, a fire extinguishing agent 52 is provided between the facing substrates 54, and the peripheral edges of the substrate 54 other than the folded part are joined and sealed by heat sealing or using an adhesive, whereby a fire extinguishing body can be obtained.

Further, the peripheral edges of a pair of substrates are joined by heat sealing or using an adhesive while leaving an opening, and after a fire extinguishing agent is inserted through the opening, the opening is joined and sealed by heat sealing or using an adhesive, whereby a fire extinguishing body can be obtained.

Moreover, a single substrate may be folded, the peripheral edges of the facing substrates may be joined by heat sealing or using an adhesive while leaving an opening, and after a fire extinguishing agent is inserted through the opening, the opening may be joined and sealed by heat sealing or using an adhesive, whereby a fire extinguishing body can be obtained.

When a fire extinguishing agent composition containing a fire extinguishing agent and a binder is used as the fire extinguishing agent, for example, a coating liquid containing the fire extinguishing agent composition may be applied to a resin layer or a fire extinguishing agent support layer to form a fire extinguishing agent layer, and this layer may be used to provide the fire extinguishing agent between the substrates. Further, a resin kneaded with a fire extinguishing agent may be placed on a substrate to provide the fire extinguishing agent between substrates. The fire extinguishing agent (fire extinguishing agent-containing layer) may be a layer of a composition containing a fire extinguishing agent and a binder, or a resin layer containing a fire extinguishing agent.

Summary of Present Embodiment

[Invention 1]

A fire extinguishing body comprising a packaging bag formed from one or more substrates each comprising a resin layer, and a deliquescent fire extinguishing agent sealed in the packaging bag, the packaging bag having a sealing part at its peripheral edge, and the adhesion strength between the substrates in the sealing part being 5 N/15 mm or more.

[Invention 2]

The fire extinguishing body according to Invention 1, wherein the resin layer comprises a polyolefin resin.

[Invention 3]

The fire extinguishing body according to Invention 1 or 2, wherein the substrate has a thickness of 4.5 to 1000 μm.

[Invention 4]

The fire extinguishing body according to any one of Inventions 1 to 3, wherein the substrate further comprises a gas barrier layer.

[Invention 5]

The fire extinguishing body according to Invention 4, wherein the gas barrier layer comprises a metal layer or a metal oxide layer.

[Invention 6]

The fire extinguishing body according to any one of Inventions 1 to 5, wherein the resin layers are thermally fused together in the sealing part.

[Invention 7]

The fire extinguishing body according to any one of Inventions 1 to 6, wherein the sealing part has a width of 5 mm or more.

EXAMPLES

The present invention will be described in more detail by the following examples. However, the present invention is not limited to these examples.

<Production of Fire Extinguishing Body>

Example 1

Epoxy-urethane synthetic adhesives AD-393 and CAT-EP5 produced by Toyo Ink Co., Ltd. were prepared, and IPA was prepared as a diluting solvent. These were mixed at a formulation ratio of 15:1:25.7, and then stirred for 1 minute to produce an adhesive for dry lamination with a solid content of 20 mass %.

A LDPE film (produced by Mitsui Chemicals Tohcello, Inc., thickness: 30 μm) and GL-ARH (produced by Toppan Inc., thickness: 12 μm), which is a PET film comprising an alumina deposition layer, were prepared.

The adhesive for dry lamination was applied to the alumina deposition layer side of GL-ARH by a bar coating method using a wire bar #14, and dried in an oven at 80° C. for 30 seconds to obtain an adhesive layer with a dry coating weight of 2 g/m2.

Using a tabletop laminator FA-570 produced by Taisei Laminator Co., Ltd., the corona-treated side of the LDPE film was bonded to the adhesive layer at a laminating temperature of 60° C. and a pressure of 0.5 MPa to obtain a laminated film.

Two 50-mm square samples were cut from the laminated film and placed on a heat sealer TP-701-B produced by Tester Sangyo Co., Ltd. with the LDPE films facing each other. Then, the three edges of the laminated film were thermally fused at 100° C. and 0.3 MPa for 0.5 seconds using a sealing bar 1 cm in width and 30 cm in length so that the width of the thermally fused part was 1 cm, thereby obtaining a laminated film bag.

As a fire extinguishing agent, 8.2 g of a deliquescent ABC fire extinguishing agent produced by Morita Miyata Corporation was weighed and placed in the laminated film bag.

The opening edge was heat-sealed using the heat sealer described above under the same conditions as those described above to produce a fire extinguishing body.

Other Examples and Comparative Examples

Fire extinguishing bodies were produced in the same manner as in Example 1, except that the heat sealing conditions were changed as shown in Table 1.

<Evaluation of Fire Extinguishing Bodies>

The following evaluations were carried out on the fire extinguishing body of each example. Table 1 shows the results.

(Measurement of Adhesion Strength)

The thermally fused part of the fire extinguishing body obtained in each example was cut into a 15-mm-wide sample. The sample was peeled off in a T-shape at a peeling speed of 300 mm/min in a tensile tester placed in an environment at room temperature of 23° C. according to JIS K 6854-3, and the strength was measured from the start of peeling to the point where the thermally fused part was separated. This measurement was performed three times at different locations in the thermally fused part, and the average value was used as the adhesion strength between the substrates.

(Measurement of Total Light Transmittance)

The total light transmittance of the fire extinguishing body obtained in each example was measured. Specifically, a haze meter (produced by BYK Instruments) was used for the measurement. After calibration of the instrument, the sample was fixed so that the light entering the integrating sphere from the light source passed through the fire extinguishing agent placed in the laminated film bag of the fire extinguishing body. The total light transmittance was measured immediately after the fire extinguishing body was produced (initial stage), and after the elapse of a certain period of time (88 hours or 232 hours) after the fire extinguishing body was placed in an 85° C.-85% RH constant temperature and humidity chamber. This process was performed three times at different measurement points, and the average value was recorded. As the fire extinguishing agent deliquesces, the fire extinguishing agent becomes more transparent and the total light transmittance increases. Therefore, the degree of deliquescence of the fire extinguishing agent can be determined by measuring the total light transmittance.

TABLE 1

| | Heat sealing conditions | | Adhesion | Total light transmittance (%) | | |
|---|---|---|---|---|---|---|
| | Temperature (□C) | Time (sec) | strength (N/15 mm) | Initial | 88 hours later | 232 hours later |
| Comparative Example 1 | 100 | 0.2 | 0.3 | 8.46 | N.D.* | 55.3 |
| Comparative Example 2 | 100 | 0.4 | 3 | 8.12 | 21.4 | 55.7 |
| Example 1 | 100 | 0.5 | 7 | 8.26 | 16.9 | 35.5 |
| Example 2 | 100 | 0.7 | 11 | 8.34 | 16.4 | 37.3 |
| Example 3 | 100 | 1.0 | 14 | 8.18 | 17.5 | 36.7 |
| Example 4 | 100 | 50 | 15 | 8.29 | 17.6 | 39.0 |
| Example 5 | 120 | 0.3 | >30 | 8.29 | 17.6 | 35.4 |
| Example 6 | 140 | 2.0 | >30 | 8.48 | 17.4 | 36.9 |

INDUSTRIAL APPLICABILITY

The fire extinguishing body of the present invention can be suitably used particularly for components that are used for industrial materials, such as construction materials, automotive parts, aircraft parts, and electronics parts.

[Reference Signs List] 10, 20, 30, 60 . . . Fire extinguishing body; 11, 21, 31, 61 . . . Packaging bag; 12, 22, 42, 52, 62 . . . Fire extinguishing agent 23 . . . Adhesive; 11*a*, 21*a*, 31*a* . . . Sealing part; 31*b* . . . Folded part; 44, 54 . . . Substrate; 63 . . . Adhesion layer; 64 . . . Sticky layer (adhesion layer); 65 . . . Release film; 611 . . . Resin layer; 612 . . . Gas barrier layer; 613 . . . Fire extinguishing agent support layer.

What is claimed is:

1. A fire extinguishing body comprising:

a packaging bag formed of a base material including a resin layer; and a deliquescent fire extinguishing agent sealed in the packaging bag, wherein the packaging bag has a sealing portion on a periphery thereof, the deliquescent fire extinguishing agent comprises a binder, and an adhesion strength between the base materials at the sealing portion is 5 N/15 mm or more.

2. The fire extinguishing body according to claim 1, wherein the resin layer comprises a polyolefin resin.

3. The fire extinguishing body according to claim 1, wherein the base material has a thickness of 4.5 to 1000 μm.

4. The fire extinguishing body according to claim 1, wherein the base material further comprises a gas barrier layer.

5. The fire extinguishing body according to claim 4, wherein the gas barrier layer includes a metal layer or a metal oxide layer.

6. The fire extinguishing body according to claim 1, wherein, in the sealing portion, the resin layers are heat-sealed together.

7. The fire extinguishing body according to claim 1, wherein the sealing portion has a width of 5 mm or more.

8. The fire extinguishing body according to claim 1, wherein the deliquescent fire extinguishing agent is in the form of a powder.

9. The fire extinguishing body according to claim 1, wherein the deliquescent fire extinguishing agent comprises at least one of an inorganic salt and an organic salt.

10. The fire extinguishing body according to claim 9, wherein the organic salt comprises at least one selected from the group consisting of potassium acetate, potassium citrate, and potassium tartrate, and the inorganic salt comprises at least one selected from the group consisting of potassium carbonate and potassium hydrogen carbonate.

11. The fire extinguishing body according to claim 1, wherein a content of the deliquescent fire extinguishing agent in a composition containing the binder is 70 to 97% by mass.

12. The fire extinguishing body according to claim 5, wherein the gas barrier layer comprises an alumina vapor-deposited layer, a silica vapor-deposited layer, or a metal foil.

13. The fire extinguishing body according to claim 5, wherein the gas barrier layer includes a metal oxide vapor-deposited layer, and the metal oxide vapor-deposited layer is disposed on a side facing the deliquescent fire extinguishing agent.

14. The fire extinguishing body according to claim 4, wherein the base material comprises the resin layer serving as an inner layer and the gas barrier layer serving as an outer layer, and the resin layer and the gas barrier layer are laminated via an adhesive layer.

15. The fire extinguishing body according to claim 14, further comprising:

an adhesive layer provided on an outer surface of the packaging bag; and a release film covering the adhesive layer.

16. The fire extinguishing body according to claim 4, wherein the gas barrier layer has a water vapor transmission rate of 10 g/m2/day or less under conditions of 40° C. and 90% RH.

17. The fire extinguishing body according to claim 15, wherein the deliquescent fire extinguishing agent comprises at least one selected from the group consisting of potassium acetate, potassium citrate, potassium tartrate, potassium carbonate, and potassium hydrogen carbonate.

18. The fire extinguishing body according to claim 15, wherein:

the deliquescent fire extinguishing agent comprises at least one selected from the group consisting of potassium acetate, potassium citrate, potassium carbonate, and potassium hydrogen carbonate;

and the gas barrier layer comprises an alumina vapor-deposited layer or a metal foil.

* * * * *